United States Patent [19]
Barrett

[11] 3,771,063
[45] Nov. 6, 1973

[54] BI-POLAR PHASE DETECTOR

[75] Inventor: Ronald E. Barrett, Colorado Springs, Colo.

[73] Assignee: Calnor of El Paso, Inc., El Paso, Tex.

[22] Filed: Mar. 13, 1972

[21] Appl. No.: 234,181

[52] U.S. Cl.............. 328/134, 307/232, 307/321, 323/75 F
[51] Int. Cl. .......................................... H03b 3/04
[58] Field of Search.................. 307/321, 232; 321/47; 323/75 F, 9; 328/134

[56] References Cited
UNITED STATES PATENTS

| | | | |
|---|---|---|---|
| 2,248,793 | 7/1941 | Terry | 323/75 F |
| 2,774,932 | 12/1956 | Patton | 321/47 |
| 2,914,684 | 11/1959 | Essler | 307/232 |
| 3,093,786 | 6/1963 | Nelson et al. | 323/75 F |
| 3,214,680 | 10/1965 | Kroll | 307/321 |
| 3,244,987 | 4/1966 | Prapis et al. | 307/232 |
| 3,517,215 | 6/1970 | Richer | 307/321 |
| 3,571,695 | 3/1971 | Straiton | 307/321 X |
| 2,833,980 | 5/1958 | Hedgcock et al. | 328/134 |
| 3,422,362 | 1/1969 | West | 328/134 |

Primary Examiner—John S. Heyman
Attorney—Albert H. Pendleton et al.

[57] ABSTRACT

A phase detector employs a pair of operational amplifiers for establishing equal amplitudes for a reference signal and the signal of which the phase is to be measured. The reference signal alternately blocks an unblocks a diode bridge to provide a linear bi-polar output signal proportional to the difference in phase between the two input signals.

10 Claims, 3 Drawing Figures

BI-POLAR PHASE DETECTOR

BACKGROUND

The present invention relates to phase detectors and particularly to a phase detector which provides an unambiguous indication of the sign of the difference in phase between two input signals.

A number of phase detector circuits have been known and used in the past, and many function accurately to produce an output signal in response to the difference in phase between two input signals. However, in all but the most complicated of such detectors, the output signal has either not been a linear function of phase difference or has not been indicative of the sign of the phase difference and is accordingly not as useful for some applications as a detector which has such a capability.

It is therefore desirable to produce a phase detector in which an unambiguous indication of the sign of the phase difference is produced, with a linear function of the phase difference.

Accordingly, it is a principal object of the present invention to provide such a phase detector and to provide a simple and inexpensive construction therefor.

Another object of the present invention is to provide such a phase detector having an automatic gain control for both of the signals applied to the input of the phase detector.

These and other objects of the present invention will become manifest upon an examination of the following description and the accompanying drawings.

SUMMARY OF THE INVENTION

In one embodiment of the present invention there is provided a phase detector having a pair of operational amplifiers connected to receive two input signals and a full wave diode bridge connected with the output of both operational amplifiers and with the input of one of the operational amplifiers, to provide a linear bipolar signal having a value corresponding to the difference in phase between the two input signals. In another embodiment the phase detector has an automatic gain control feature to remove any effect of the two input signals being of differing amplitudes.

BRIEF DESCRIPTION OF THE DRAWINGS

Reference will now be made to the accompanying drawings in which.

DESCRIPTION OF THE INVENTION

Figure 1:
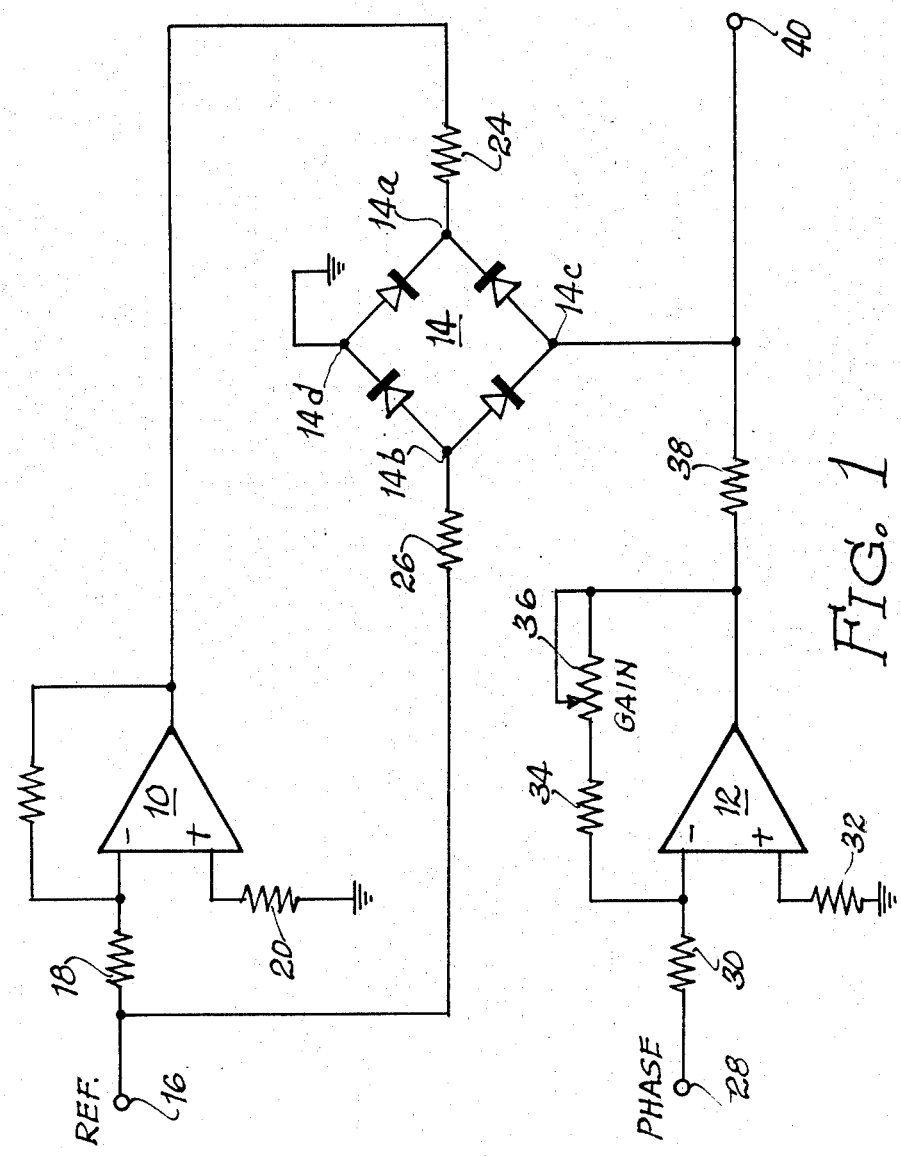
FIG. 1 is a schematic diagram of one embodiment of the present invention.

Referring first to FIG. 1, there is illustrated a bi-polar phase comparator comprised generally of a pair of operational amplifiers 10 and 12 and a full wave diode bridge 14. One of the two input signals, and preferably the reference signal, is connected to an input terminal 16 which is connected via a resistor 18 to the inverting input of the amplifier 10. The noninverting input of the amplifier 10 is connected via a resistor 20 to ground, and the output of the amplifier 10 is connected to one terminal 14a of the bridge 14 through a resistor 24. The input terminal 16 is connected to the opposite terminal 14b of the bridge 14 through a resistor 26. The bridge 14 is constructed of two circuits, both of which are connected between the terminals 14a and 14b, and both of which comprise a pair of serially connected diodes, with the anode of one diode of each circuit being connected to the terminal 14b, and the cathode of the other diode of each circuit connected to the terminal 14a.

The second input terminal 28 is provided for connection to the other input signal and this terminal is connected to the inverting input of the amplifier 12 through a resistor 30. The noninverting input of the amplifier 12 is connected to ground through a resistor 32. A feedback network is provided for the amplifier 12, connected from the output thereof to its inverting input, and comprising a series connected resistor 34 and rheostat 36. The output of the amplifier 12 is connected through a resistor 38 to the terminal 14c of the bridge 14, and the opposite terminal 14d of the bridge is connected to ground. The rheostat 36 is adjustable so that the amplitude of the output of the amplifier 12 (with reference to ground potential) is identical to that of the signal produced by the amplifier 10 (with reference to the potential of input terminal 16).

The end of the resistor 38 which is connected to the bridge is also connected to an output terminal 40 at which there is produced a voltage having a d.c. component corresponding to the magnitude of the phase difference between the signals applied to the input terminals 16 and 28.

Figure 2:
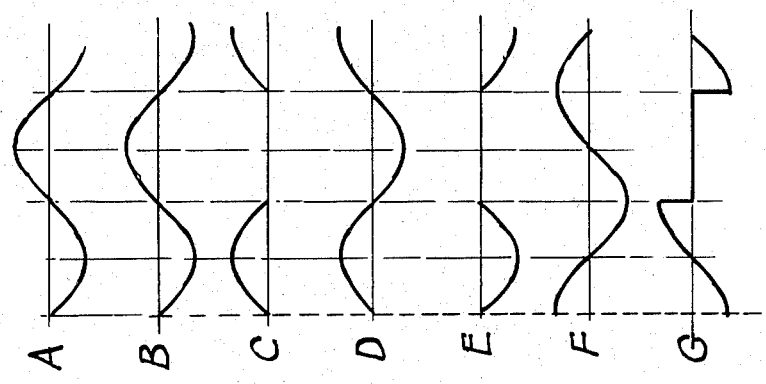
FIG. 2 is an illustration of a number of waveforms formed during the operation of the apparatus of FIG. 1 in a variety of circumstances.

In operation of the apparatus, the signal produced by the amplifier 10 alternately changes the condition of the bridge 14. When the input applied to the terminal 16 is negative with respect to ground, all four of the diodes forming the bridge 14 are reverse biased, and, in effect, the circuit through the bridge from the point 14c to ground is opened. When the signal at the terminal 16 is of the opposite polarity, the four diodes of the bridge 14 conduct, and the point 14c is effectively connected to ground, provided that the forward voltage drops of the diodes are matched. Reference to FIG. 2 will illustrate how the output produced at the output terminal 40 varies under a variety of conditions of phase difference between the input signals. In FIG. 2 the waveform A is representative of the reference signal applied to the terminal 16 and B is representative of a signal applied to the terminal 28 which is in phase with the reference signal. The waveform C corresponds to that produced at the output terminal, which is seen to be a pulsating d.c. waveform similar to that which would be derived by passing either of the input signals through a halfwave rectifier.

The waveform D is representative of a signal applied to the terminal 28 which is 180° out of phase with the reference signal applied to the terminal 16. The waveform E illustrates the signal applied to the output terminal 40 under these circumstances. It is seen to be a pulsating d.c. waveform similar to that of the waveform C, but having a d.c. value of opposite sign.

The waveform F illustrates the signal applied to the input terminal 28 which is out of phase by either 90° or 270° with respect to that applied to the input terminal 16 and the waveform G illustrates the waveform produced at the output terminal 40 under these circumstances. It is seen that the waveform contains equal areas above and below the zero axis so that the net d.c.

level of the waveform is zero. Accordingly, the apparatus of FIG. 1 produces an output of the terminal 40 having a d.c. potential of zero when the phase difference is either 90° or 270°, and an output voltage of positive and negative potential when the phase difference between the two input signals is either closer to 0° or closer to 180° from the condition producing the null.

Figure 3:
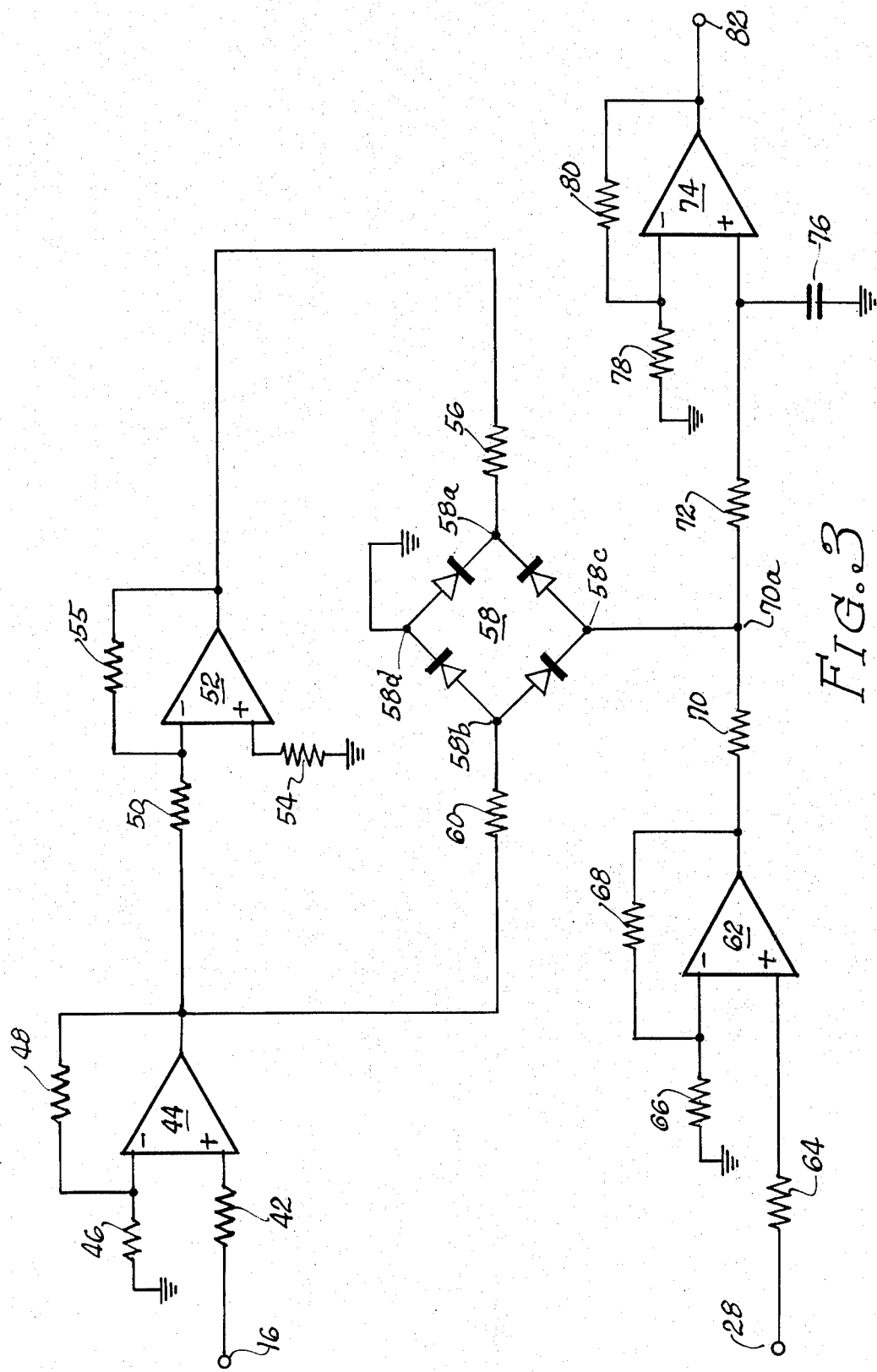
FIG. 3 is a schematic diagram of an alternative embodiment of the present invention.

Referring now to FIG. 3, an alternative embodiment of the present invention is illustrated in which an automatic gain control function is executed so that the rheostat 36 in the embodiment of FIG. 1 is not needed.

The reference input terminal 16 is connected through a resistor 42 to the noninverting input of an operational amplifier 44. The inverting input of the amplifier 44 is connected through a resistor 46 to ground and a feedback resistor 48 is connected between the output of the amplifier 44 and its inverting input. The output of the amplifier 44 is also connected through a resistor 50 to the inverting input of an operational amplifier 52, the noninverting input of which is connected through a resistor 54 to ground. The output of the amplifier 52 is connected through a feedback resistor 55 to its inverting input. The output of the amplifier 52 is also connected through a resistor 56 to a terminal 58a of a diode bridge 58, and the output of the amplifier 44 is connected through a resistor 60 to the opposite terminal 58b of the bridge. Both of the amplifiers 44 and 52 are adapted to operate in a saturated condition so that a square wave is produced at the output of the amplifier 44 having maximum and minimum values substantially equal to the positive and negative power supply voltages supplied to the amplifier 44, and in phase with the waveform applied to the terminal 16. The amplifier 52 functions to invert the signal produced by the amplifier 44. Therefore a square wave is applied to the bridge 58 through the resistors 56 and 60. The signal applied through the resistor 60 is in phase with the signal applied to the terminal 16, and has an amplitude which is completely independent of the amplitude of the input signal, provided the input signal is sufficient to saturate the amplifier 44. The signal applied through the resistor 56 is 180° out of phase with the input signal.

The other input signal applied to the input terminal 28, is connected to the noninverting input of an amplifier 62 through a resistor 64. The inverting input of the amplifier 62 is connected to ground through a resistor 66, and a feedback resistor 68 interconnects the output of the amplifier 62 with its inverting input. The output of the amplifier 62 is connected through a resistor 70 to a terminal 58c of the bridge 58, and the remaining bridge terminal 58d opposite thereto is grounded. The amplifier 62 is operated in its saturated condition and the voltage levels supplied to power it are the same as those supplied to the amplifiers 44 and 52. Accordingly, the amplifier 62 produces a square wave, in phase with the signal applied to the input terminal 28, and having a fixed amplitude independent of the magnitude of the input signal.

The operation of the circuit is substantially the same as the circuit of FIG. 1 which has been explained with reference to the waveforms of FIG. 2, except that it is not necessary to provide a rheostat for insuring regulating the amplitude of the input signal, for that is done automatically by means of the saturated amplifiers, and signals of a constant amplitude are applied to the bridge 58, irrespective of the amplitudes of the input signals.

A detector circuit is illustrated in FIG. 3 by which the d.c. level of the signal produced at the output terminal 70a may be detected. The output terminal 70a is connected through a resistor 72 to the noninverting input of an amplifier 74 which input is also connected to ground through a capacitor 76. The inverting input of the amplifier 74 is connected to ground through a resistor 78 and to the output of the amplifier 74 through a feddback resistor 80.

The circuit including the amplifier 74 functions as a low pass filter having a time constant equal to the product of the resistance of the resistor 72 and the capacitance of the capacitor 76. These values are chosen as desired to bypass the high frequency components of the output signal to ground and accumulate the d.c. component of the output signal on the capacitor 76, which is then amplified by the amplifier 74 and made available at an output terminal 82 to a utilization device.

The apparatus of the present invention is remarkably linear. The output is linear within about 2 percent within the range extending between 30° and 150° of phase difference and within 5 percent throughout the entire range from 0° to 180° phase difference.

What is claimed is:
1. A phase detector comprising:
   A. a reference terminal for connection to a source of reference a.c. signal;
   B. an inverter coupled to said reference terminal for inverting said reference a.c. signal;
   C. a blocking means including at least four terminals in which:
      1. the first of said terminals is coupled to said reference terminal; and
      2. the third of said terminals is coupled to the output of said amplifier
   said blocking means, in phase with a reference a.c. signal, alternately providing an electrically conductive path between the second and fourth terminals of said blocking means and blocking said electrically conductive path between said second and fourth terminals;
   D. a reference point coupled to said second terminal of said blocking means;
   E. an input terminal for connection to a source of input a.c. signal;
   F. amplifying means for establishing a fixed amplitude for said input a.c. signal, the input of said amplifying means being coupled to said input terminal and the output of said amplifying means being coupled to said fourth terminal of said blocking means; and
   G. an output terminal coupled to the output of said amplifying means whereby an output signal appears between said reference point and said output terminal during a portion of each period of said a.c. signal, said output signal being related to the phasic relationship between said reference a.c. signal and said input a.c. signal.

2. The phase detector of claim 1 wherein said blocking means includes a diode bridge having
   A. first and second diodes coupled between said first and third terminals of said blocking means, the cathode of said first diode and the anode of said second diode being coupled together and to said second terminal; and
   B. third and fourth diodes in which:

1. the cathode of said third diode is coupled to the cathode of said first diode;
2. the anode of the fourth diode is coupled to the anode of said second diode; and
3. the anode of said third diode and the cathode of said fourth diode are coupled together and to said fourth terminal of said blocking means.

3. The phase detector of claim 2 wherein said reference point is ground.

4. The phase detector of claim 3 wherein both said inverter and said amplifying means are operational amplifiers.

5. The phase detector of claim 4 including:
A. a first resistance coupled between said reference terminal and diode bridge; and
B. a second resistance coupled between said inverter and said diode bridge.

6. The phase detector of claim 4 including a resistance coupled between the output of said amplifying means and said diode bridge.

7. The phase detector of claim 4 wherein said output terminal is connected directly to both the cathode of said third diode and the anode of said fourth diode.

8. The phase detector of claim 4 including adjusting means coupled to said amplifying means for selectively controlling the gain of said amplifying means.

9. The phase detector of claim 4 including biasing means for biasing said amplifying means to saturate in response to said input a.c. signal, whereby the output signal of said amplifying means is in phase with said input a.c. signal and has an amplitude independent of the amplitude of said input a.c. signal.

10. The phase detector of claim 9 including biasing means for biasing said inverter to saturate in response to said reference a.c. signal, whereby the output signal of said inverter and said amplifying means have equal amplitude.

* * * * *